Jan. 7, 1969     J. F. McCORMICK     3,420,287
RESILIENT LOCKING CLIP
Filed June 14, 1967
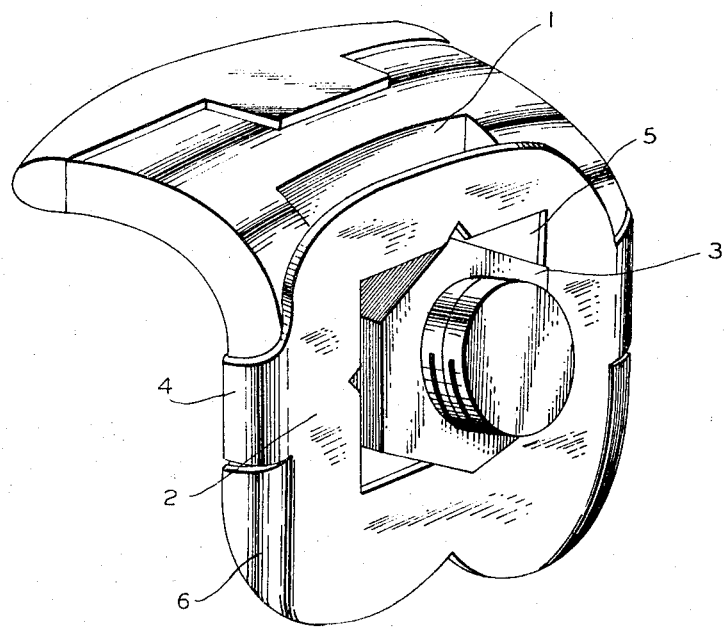
INVENTOR
JAMES F. McCORMICK
BY *Paris, Haskell & Levine*
ATTORNEYS

United States Patent Office 3,420,287
Patented Jan. 7, 1969

3,420,287
RESILIENT LOCKING CLIP
James F. McCormick, 90 Green St., Newark, N.J. 07102
Filed June 14, 1967, Ser. No. 646,131
U.S. Cl. 151—60                          1 Claim
Int. Cl. F16b *39/02*

ABSTRACT OF THE DISCLOSURE

A unitary member for preventing loosening of the retainer clamp for holding the rims and tires on truck wheels comprising a body member conforming to the curvature of the clamp and having an opening to fit over the nut, a pair of integral inwardly directed wings on the sides of the body member for engaging the sides of the clamp, and a pair of integrally formed U-shaped spring arms spaced from the wings and passing about the opposite sides of the clamp and engaging the rear side of the clamp.

---

The present invention relates to an all metal clip device to prevent the clamp nuts, commonly used to hold rims and tires on truck wheels, from loosening.

I, James F. McCormick of Newark, N.J., claim that loosening of clamp nuts on motor truck wheels, due to vibration in over the road travel, frequently causes not only loosening, but actual loss, of the nuts, with the consequential result of loss of an entire wheel, which in turn, quite obviously is a definite highway accident hazard.

In view of the foregoing, I further claim that this invention is in fact a device designed specifically for safety on the highways.

The simplicity with which this device can be applied will become apparent from the following detailed description, which is keyed to the enclosed detail drawing of same.

FIG. 1 shows the device in perspective as it would be applied to a standard tire or wheel clamp lug. The clamp 1 is secured to the wheel of the truck by a standard hex or square nut and bolt 3. After it is in place, the locking device 2 is simply inserted over the head of the nut, spread and by simple spring tension held permanently in place on the clamp. It is impossible for the nut to move for any reason or cause. This fundamentally is the principle of operation and function. The concaved surface 2 is shaped to conform to the standards for lug or clamps according to S.A.E.—in short, this is a universal type of fitting. The numeral 5 shows the shape and stamping design of the opening, which it is quite apparent, will accommodate either a hex or a square type nut. The numeral 4 shows the holding arms as they extend backwardly to engage the back of the clamp.

The numeral 6 indicates the integrally formed wing portions that project rearwardly from the main body portion and engage the sides of the clamp. The side engaging of wings 6 is, as shown, considerably greater than that of U-shaped arms 4 to restrain rotation or translation of the lock over the clamp. Spring tension maintains constant locking pressure on the clamp, thus assuring a permanent lock, and insuring the safe factor which the inventor claims for this device.

The device itself is fabricated of a stamped metal plate of .032" thickness, cold rolled annealed spring steel, shaped to conform to the aforesaid mentioned details and as shown on the accompanying drawing.

I claim:
1. A lock member for preventing rotation and loosening of a nut fastening a generally L-shaped clamp that retains the rims and tires on truck wheels comprising: a unitary sheet metal body member having an arcuate surface generally conforming with the curved surface of the clamp and having a central opening for passing over and locking a square and hex-shaped nut, said body member having a pair of inwardly directed wing portions on opposite sides thereof for engaging the downwardly directed opposite sides of the clamp and serving as stops to prevent angular displacement of the body member with respect to the clamp, and a pair of integrally formed U-shaped spring arms disposed on opposite sides of the body member and spaced from the wing portions for passing about the opposite sides of the clamp member to engage the rear surface of the clamp member and thereby prevent separation of the body member from the clamp, said wing portions provided with a greater surface area engageable with the sides of the clamp than that of the U-shaped arms whereby forces tending to loosen the nut and rotate the lock member are restrained by the wing portions and said spring arms prevent separation of the lock member from the clamp in response to transversely directed forces.

References Cited
UNITED STATES PATENTS 2,189,654    2/1940    Rief _____ 151—52
2,307,747    1/1943    Pflueger _____ 151—44

FOREIGN PATENTS 280,154    11/1914    Germany.
375,090    9/1939    Italy.

MARION PARSONS, Jr, *Primary Examiner.*